(12) United States Patent
Shinya et al.

(10) Patent No.: US 7,476,454 B2
(45) Date of Patent: Jan. 13, 2009

(54) SUBSTRATE FOR MAGNETIC RECORDING MEDIUM

(75) Inventors: Naofumi Shinya, Takefu (JP); Norio Yamagata, Takefu (JP)

(73) Assignee: Shin-Etsu Chemical Co., Ltd., Chiyoda-Ku, Tokyo (JP)

( * ) Notice: Subject to any disclaimer, the term of this patent is extended or adjusted under 35 U.S.C. 154(b) by 69 days.

(21) Appl. No.: 11/066,696

(22) Filed: Feb. 25, 2005

(65) Prior Publication Data

US 2005/0196587 A1 Sep. 8, 2005

(30) Foreign Application Priority Data

Mar. 3, 2004 (JP) .............................. 2004-058601

(51) Int. Cl.
*G11B 5/65* (2006.01)
*G11B 5/71* (2006.01)

(52) U.S. Cl. ................. 428/846.2; 428/846.9; 428/410; 360/135

(58) Field of Classification Search ................ 428/846, 428/846.9, 848.2, 848.3, 848.8, 64.2, 64, 428/410, 848, 166, 900, 832.2, 843, 8; 134/2, 134/3; 360/135, 136; 369/13.35; 65/30.1; 501/53; 117/3
See application file for complete search history.

(56) References Cited

U.S. PATENT DOCUMENTS

| | | | | |
|---|---|---|---|---|
| 6,096,445 | A * | 8/2000 | Terakado et al. | ......... 428/848.3 |
| 6,248,416 | B1 * | 6/2001 | Lambeth et al. | ......... 428/832.2 |
| 6,284,039 | B1 * | 9/2001 | Mule'Stagno et al. | ......... 117/3 |
| 6,537,648 | B1 * | 3/2003 | Takahashi et al. | ......... 428/846 |
| 6,553,788 | B1 | 4/2003 | Ikeda et al. | |

(Continued)

FOREIGN PATENT DOCUMENTS

JP 53-57144 5/1978

(Continued)

OTHER PUBLICATIONS

Translation Seki (Keiichi) et al (JPO 06-012651).*

(Continued)

*Primary Examiner*—Carol Chaney
*Assistant Examiner*—Louis Falasco
(74) *Attorney, Agent, or Firm*—Myers Bigel Sibley & Sajovec, P.A.

(57) ABSTRACT

Provided is a surface-treated substrate in which the roughness of the surface of the substrate is controlled. The surface-treated substrate can form a magnetic recording medium in which head flying stability is maintained and which has a magnetic film that can achieve high recording densities. Also provided is a method for roughening the surface of the substrate. More specifically, provided is a surface-treated silicon substrate for a magnetic recording medium in which a surface used for forming a recording layer has 40 to 1000 protrusions per 1 $\mu m^2$ with a maximum height of 10 nm or less and an average roughness of 0.3 to 2.0 nm, and in which there are no defects or spots on any of the surface. Furthermore, provided is a method for manufacturing the surface-treated silicon substrate for the magnetic recording medium, comprising a step of etching a surface of a silicon substrate, wherein ultrasound is applied to the surface of the silicon substrate with the substrate shaken or rotated. Also provided is a magnetic recording medium, comprising the silicon substrate.

3 Claims, 4 Drawing Sheets

U.S. PATENT DOCUMENTS

| | | | |
|---|---|---|---|
| 6,569,792 B2 | 5/2003 | Zou et al. | |
| 6,576,353 B1 * | 6/2003 | Mitani et al. | 428/846.9 |
| 6,613,620 B2 * | 9/2003 | Fujimoto et al. | 438/166 |
| 2002/0064620 A1 * | 5/2002 | Mitani et al. | 428/64.4 |
| 2002/0164505 A1 * | 11/2002 | Yokoyama et al. | 428/848 |
| 2003/0164005 A1 * | 9/2003 | Saito et al. | 134/3 |
| 2004/0058196 A1 * | 3/2004 | Lambeth | 428/843 |
| 2004/0265641 A1 * | 12/2004 | Ishii et al. | 428/848 |

FOREIGN PATENT DOCUMENTS

| | | | |
|---|---|---|---|
| JP | 04-259908 A | | 9/1992 |
| JP | 06-012651 | * | 1/1994 |
| JP | 7-263406 | | 10/1995 |
| JP | 10-340443 A | | 12/1998 |
| WO | 03021579 | * | 3/2003 |

OTHER PUBLICATIONS

English translation of the Office Action for corresponding Japanese Patent Application No. 2004-058601 dated Jan. 23, 2008 (3 pages).
Written Opinion and Search Report (from Australian Patent Office) for Application No. SG 200501669-6 mailed Nov. 27, 2007 (8 pages).

* cited by examiner

Mean (RMS) height : 070 (0.14) nm

Mean (RMS) height : 2.38 (0.59) nm

SUBSTRATE FOR MAGNETIC RECORDING MEDIUM

RELATED APPLICATION

This application claims priority from Japanese Patent Application No. 2004-058601, filed Mar. 3, 2004, the disclosure of which is incorporated by reference herein in its entirety.

BACKGROUND OF THE INVENTION

1. Field of the Invention

The present invention relates to a substrate for magnetic recording medium and to a method for manufacturing the substrate for magnetic recording medium.

2. Description of the Related Art

The recording density (surface density) of magnetic recording has increased extremely rapidly and continuously at yearly rates of 50 to 200% for these past 10 years. At the mass production level, products with 70 Gbits/inch$^2$ are shipped, while surface recording densities several times higher, namely 160 Gbits/inch$^2$, have been reported at the laboratory level. Surface recording densities at the mass production level correspond to 80 Gbytes per one platter of a 3.5" HDD (3.5 inch HDD), and correspond to 40 Gbytes per single platter of a 2.5" HDD. At these recording volumes, installation of single platter recording media gives a sufficient volume for use in an ordinary desk top personal computer (equipped with a 3.5" HDD) or a laptop personal computer (equipped with a 2.5" HDD).

It is expected that recording densities will also continue to improve in the future. However, the conventional horizontal magnetic recording methods are approaching their thermal fluctuation recording limit, and it seems that they will be replaced by perpendicular magnetic recording when recording densities of 100 Gbit/inch$^2$ to 200 Gbit/inch$^2$ are reached. At the present time it is not certain what the recording limit of perpendicular magnetic recording will be, but it is believed that 1000 Gbit/inch$^2$ (1 Tbit/inch$^2$) is achievable. If these types of high recording densities are achieved, it will be possible to obtain a recording volume of 600 to 700 Gbytes per single platter of a 2.5" HDD.

In order to realize such a high recording density, the flying height of the magnetic recording head must be reduced from the conventional 30 nm to 10 nm or less, and smoothing of the substrate surface is essential. However, it has recently been found that problems such as the head adhering to the substrate or a loss of head flying stability occur when micro level surface roughness is too small. That is, a substrate having extremely low waviness and micro waviness and having a roughness of about 0.3 to 2.0 nm is ideal. (Regarding unevenness of a substrate to be used for a magnetic recording medium having a magnetic film, waviness stands for an observable range of 5 to 100 mm, micro waviness stands for an observable range of 80 µm to 5 mm, and roughness stands for an observable range of up to 80 µm.)

At present, glass substrates are textured by tape polishing, but the desired roughness is not achievable and it is not possible to lower the roughness to the desired head height.

The methods for surface-roughening silicon substrates include a dry etching method with chlorine (Japanese Patent Application Unexamined Publication No. 7-263406/1995) and a method of treatment with alkali hydroxide (Japanese Patent Application Unexamined Publication No. 53-7144/1978). However, although it is possible to control the degree of surface roughening with these methods, it is not possible to finish the entire substrate with a uniform roughness. That is, because the substrate is etched while the substrate rests motionless in a non-uniform atmosphere during etching, selective etching occurs and defects form due to the effect of process strains residual on the substrate. The reality at present is that it is not possible to obtain a uniform roughness with such simple acid or alkali etching.

SUMMARY OF THE INVENTION

Accordingly, the present invention provides a substrate for a magnetic recording medium in which roughness of the surface of the substrate is controlled, in which head flying stability is maintained, and that has a magnetic film that can achieve high recording densities. The present invention also provides a method for roughening the surface of the substrate.

In the present invention, in order to address such issues, it has been found as a result of repeated investigations that the roughness of the surface of the substrate can be made uniform preferably by shaking or rotating the surface of a substrate for a magnetic recording medium in an alkali solution, particularly one into which ultrasound has been transmitted and a surfactant has been added. The present invention has been completed by thorough confirmation of the details of these conditions.

More specifically, the present invention provides a silicon substrate for a magnetic recording medium in which a surface to be used for forming a recording layer has 40 to 1000 protrusions per one µm$^2$ with a maximum height of 10 nm or less and average roughness of 0.3 to 2.0 nm, and in which there are no defects or spots of any of the surface. Furthermore, the present invention provides a method for manufacturing a silicon substrate for a magnetic recording medium comprising a step of etching the surface of the silicon substrate, the step comprising applying ultrasound to the surface of the silicon substrate which has been shaking or rotating. The present invention also provides a magnetic recording medium comprising the silicon substrate.

With the present invention, it is possible to adjust the flying height of the magnetic recording head to lower than has been conventionally possible, and to realize high recording density.

Figure 1A:
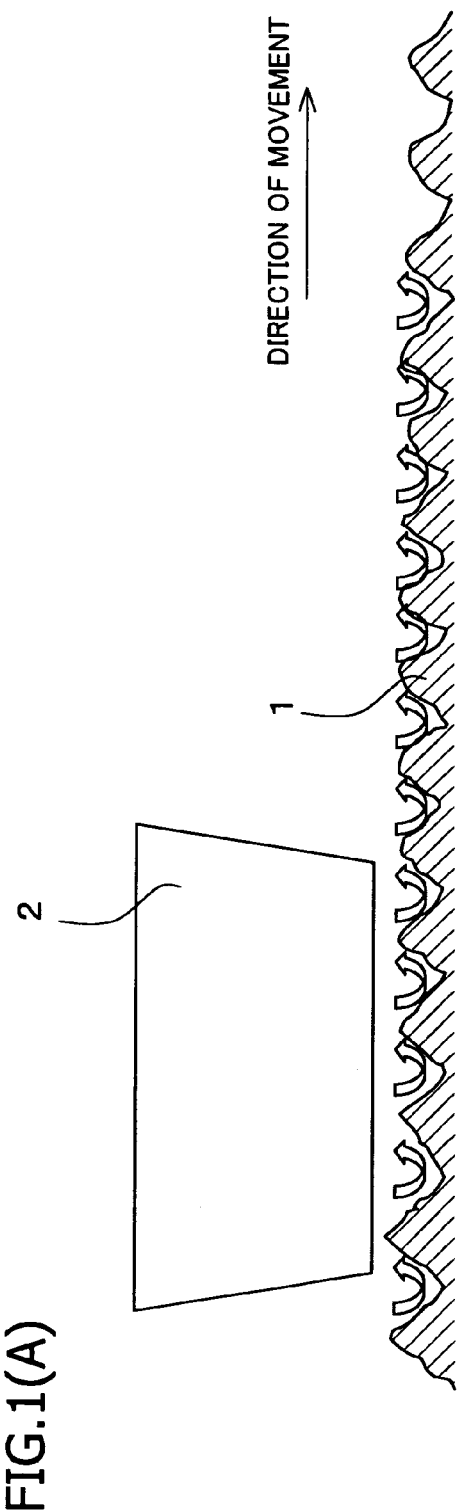
FIG. 1(A) conceptually shows a relationship between a magnetic recording medium in which a silicon substrate of the present invention is used, and a head.

Various aspects of the present invention will now be described in more detail with respect to other embodiments described herein. It should be appreciated that the invention can be embodied in different forms and should not be construed as limited to the embodiments set forth herein. Rather, these embodiments are provided so that this disclosure will be thorough and complete, and will fully convey the scope of the invention to those skilled in the art.

In the drawings, the thickness of lines, layers and regions may be exaggerated for clarity. It will be understood that when an element is referred to as being "on" another element, it can be directly on the other element or intervening elements may also be present.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise.

Unless otherwise defined, all technical and scientific terms used herein have the same meaning as commonly understood by one of ordinary skill in the art to which this invention belongs.

DETAILED DESCRIPTION OF THE PREFERRED EMBODIMENTS

According to the present invention, it is possible to impart a uniform roughness particularly to a surface of a substrate for a magnetic recording medium in which silicon is used, preferably by shaking or rotating the surface of the substrate in an alkali solution containing a surfactant in which ultrasound is being transmitted.

There is no particular limitation to the silicon substrate used in the present invention. The silicon substrate may include a monocrystalline or polycrystalline silicon substrate, and a p-type or n-type silicon substrate. And there is also no particular limitation to the manufacturing method of the silicon substrate. That is, the substrate can be prepared even from recycled wafers to be discarded, for example, because the silicon substrate is not influenced by the silicon's own electrical properties. Thus, the substrates used in the present invention can be characterized in that their raw material costs can be kept low.

In etching, the application of ultrasound is for the purpose of preventing selective etching from occurring on the surface of the silicon substrate. The vibration of the etching solution with ultrasound can generate uniform etching so that a uniform roughness will be imparted to the substrate for a magnetic recording medium. Furthermore, it seems that ultrasound has an effect of preventing the attachment of gas (hydrogen) on the substrate surface and preventing the reattachment of impurities and grit. In order to give uniform and effective control of the roughness of the surface of the substrate, the frequency of the ultrasound may be preferably 30 to 3000 kHz.

The substrate is shaken and rotated in order to receive the ultrasound evenly over the entire substrate. It seems that this combination may be effective because of the nature of ultrasound. Shaking of the substrate means the action of rocking or shaking, and may include, for example, moving the substrate vertically, or moving it from side to side.

It is preferable that shaking or rotation occurs 1 to 80 times per minute to give uniform control of the roughness of the substrate surface. Herein, one shake is counted as one vertical cycle or one horizontal cycle, for example.

The etching agent to be used during etching may be preferably an alkali solution containing a surfactant, a mixture containing a surfactant and an alkaline salt, and an alkali detergent having a pH value of 10 to 13. Even more preferable is the use of an alkali etching agent which has been is adjusted to have a pH value of 11 to 12. This pH range may be preferable because the roughness of the surface of the substrate can be uniformly and effectively controlled.

Preferably, the alkaline salt can be one or more salts selected from the group consisting of potassium hydroxide, sodium hydroxide, sodium carbonate, sodium hydrogencarbonate, ammonium hydroxide, potassium carbonate and potassium hydrogencarbonate.

The alkaline salt may be added so that the potassium hydroxide, sodium hydroxide or the like will provide a predetermined pH. It may be preferable that the amount of the alkaline salt is adjusted so that it will be about 0.001 to 1M in the etching solution.

The surfactant in the etching solution may preferably include one or more surfactants selected from the group consisting of non-ionic surfactants such as polyoxyalkylene alkyl ether and polyoxyalkylene alkyl phenyl ether; anionic surfactants such as alkylbenzenesulfonic acid and salts thereof, alkyl phosphate, polyoxyalkylene alkyl phenyl ether sulfonic acid and salts thereof and polyoxyalkylene alkyl ether sulfonic acid and salts thereof; and cationic surfactants such as a fluorine-based surfactant; a salt of high amine and halogen acid (wherein the amine contains at least one alkyl group containing 10 to 20 carbon atoms), halogenated alkylpyridinium and tertiary ammonium salts. The surfactant may be more preferably a non-ionic or anionic surfactant.

Specific examples of the surfactant may include compounds such as sodium laurylsulfate, tetraethyl ammonium chloride, polyoxyethylene-(10) octyl phenyl ether, polyoxyethylene-(10) octyl ethyl ether, LIPON-F (manufactured by Lion Corporation), CLEAN THROUGH (manufactured by Kao Corporation) and EXCEM LIGHT (manufactured by Kyoeisha Chemical Co. Ltd).

It may be preferable that the concentration of the surfactant in the etching solution is 0.01 to 10% by weight. This range may be preferable from the point of view of wettability, prevention of re-adhesion of grit, prevention of bubbles attached to the surface of the substrate, and productivity (including cost and waste solution treatment). More specifically, when the concentration is less than 0.01% by weight, there may be deterioration of the wettability of the substrate surface and its ability to reduce grit attached, or there may be cases in which air bubbles start to adhere. If the concentration is greater than 10% by weight, problems of cost and treatment of the waste solution may start to occur.

The surfactant is added to improve the wettability of the surface of the substrate and to realize uniform etching. The surfactant may also have a role of preventing gas (hydrogen) which has been generated during the etching from adhering to the surface of the substrate so that uneven etching can be prevented. The surfactant may have a further role of preventing the re-adherence of impurities or grit that has been present in the etching solution.

Furthermore, from the view of prevention of selective etching and mass production, it may be preferable that the temperature of the etching agent is maintained at room temperature or is heated to 20 to 90° C. during the etching.

It may be particularly preferable that an etching agent contains 1% by weight or less of surfactant and 0.1 mol or less of alkali hydroxide and has a pH value of about 12.

It may be preferable that the substrate is polished and washed before the step of etching.

There is no particular limitation to the polishing, but one example is polishing with a non-woven cloth using colloidal silica or the like, and then polishing using a polishing cloth (suede-type).

The washing may be preferably performed by chemical washing such as RCA washing in use of $H_2O_2$—$NH_4OH$, or scrubbing in use of a detergent.

The process of etching may be preferably performed by applying ultrasound to the alkali solution containing a surfactant, and immersing the polished and washed substrate while rotating the substrate at 1 to 80 rpm (in the case of shaking, the vertical motion is 1 to 80 times per minute). The immersion may preferably last about 1 to 300 minutes (rotation and immersion occur simultaneously).

During etching, any one of lack of shaking or rotating, lack of application of ultrasound, and lack of a surfactant in an etching agent may cause the selective etching of the surface of the silicon substrate so that defects or spots are generated and a uniform roughness is not obtained.

The scrubbing and drying, immediately following the step of etching, may provide a substrate for a magnetic recording medium having a uniform roughness.

The scrubbing may be preferably performed using a brush, or a relatively soft substance such as a sponge (of PVA or urethane, for example). The drying may be preferably performed by hot air, cool air or spin drying.

Furthermore, when the substrate is not washed immediately following the step of etching, it may be preferable to store the substrate with a surfactant at a pH value of about 3 to 6. When the substrate is stored in an alkali of pH 8 or greater or in a strong acid solution of pH 2 or less, then etching continues and the desired surface condition may not be obtained. That is, it is possible to ensure a uniform roughness by storing the substrate in an acidic detergent solution after the step of etching. This is because storage in an acidic detergent solution prevents the etching from proceeding any further, and because there is a possibility that etching may proceed due to residual alkali that adheres to the surface of the substrate if the substrate is stored in water.

Examples of the surfactant for storing may preferably include a non-ionic surfactant agent such as polyoxyalkylene alkyl ether. The surfactant may be present at a concentration of 0.01 to 10% by weight in the storage solution. Water may be preferable as the solvent of the storage solution. It may be preferable to hold the pH at about 3 to 6, and the solution may be adjusted using an acid such as hydrochloric acid, nitric acid, sulfuric acid, acetic acid, or a salt of thereof.

The substrate for a magnetic recording medium of the present invention is characterized by the following. The substrate is extremely flat, apart from the roughness (for a substrate used for a magnetic recording medium having a magnetic film, unevenness may be expressed by waviness in a range of 5 to 100 mm, micro-waviness in a range of 80 μm to 5 mm, and roughness in a range of up to 80 μm). The number of protrusions on the surface for recording information is 40 to 1000 per 1 μm$^2$, preferably 40 to 500 per 1 μm$^2$, the maximum height of the protrusions is 10 nm or less, and the surface roughness is in a range of 0.3 to 2.0 nm. As a result, there is no adhesion even if the magnetic recording head comes within 10 nm of the surface of the substrate so that the flying of the head is stable.

When the number of protrusions on the surface on or above which information will be recorded is outside the range of 40 to 1000 per 1 μm$^2$, the flying characteristics of the head become unstable.

When the maximum height exceeds 10 nm, if the flying height of the head is lowered in order to increase the recording density, then the head and the substrate will make contact. Moreover, since the flying height of the head is 10 nm or less, it is necessary to ensure the maximum height of the indentations or unevenness on the surface of the substrate is not more than 10 nm.

Furthermore, when the average roughness is less than 0.3 nm, adhesion occurs between the head and the substrate in addition to a reduction in the flying stability of the head. When the average roughness is greater than 2.0 nm, then it is not possible to obtain a substrate surface for high recording density.

It should be noted that the maximum height and the average roughness are measured with an atomic force microscope (AFM), using the observation area of 10 μm square. The number of protrusions is measured visually by AFM observation.

Figure 1B:
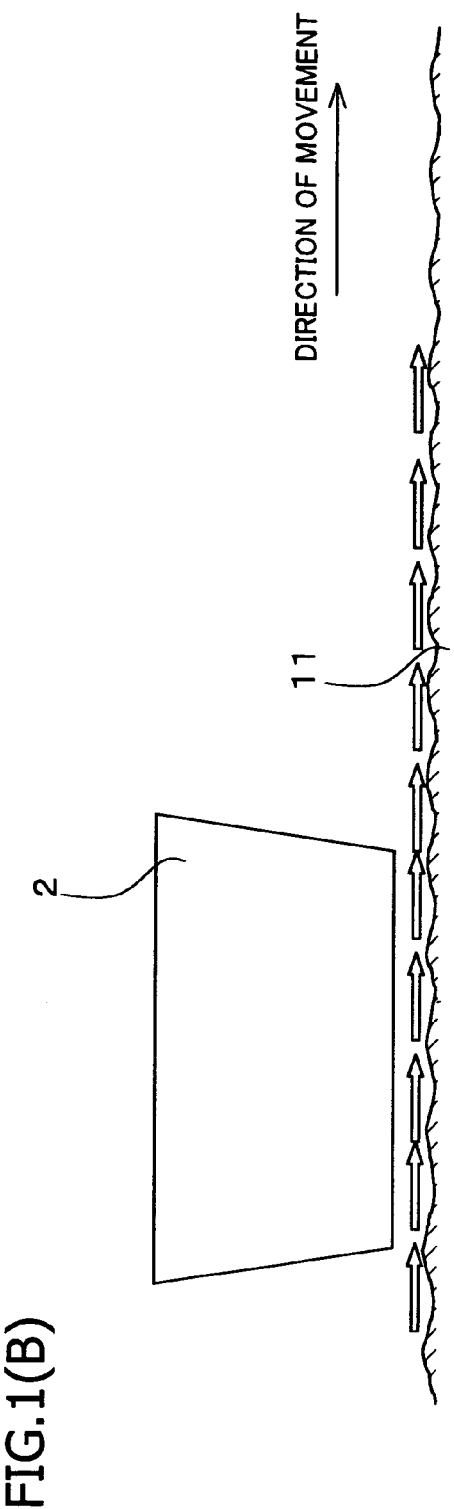
FIG. 1(B) is a diagram that schematically shows a relationship between a magnetic recording medium in which a conventional silicon substrate is used, and the head.

FIG. 1(A) conceptually shows a relationship between a magnetic recording medium 1 in which a silicon substrate of the present invention is used, and a head 2. FIG. 1(B) is a diagram that schematically shows a relationship between a magnetic recording medium 11 in which a conventional silicon substrate is used, and the head 2. In FIG. 1(A), buoyancy is generated by rotation of the substrate and the buoyance of the head is improved so that there is no adhesion. On the other hand, in FIG. 1(B), since the buoyancy is not generated by the rotation of the substrate, the buoyance of the head is unstable so that adhesion also occurs.

The roughness (Ra) is 0.30 to 2.00 nm in FIG. 1(A), and less than 0.30 nm in FIG. 1(A). However, the effect of the present invention cannot be obtained by focusing on the roughness (Ra) alone. The effect of the present invention is obtained by providing a substrate with a metal film having a predetermined number of protrusions and a predetermined maximum height, in addition to a predetermined roughness. Stated simply, the effect of the present invention is obtained by providing conditions in which the head moves like an air hockey puck.

A substrate of the present application which has been etched in this way can be coated with a recording layer and used as a recording medium.

The silicon substrate of the present invention may be used as a magnetic recording medium by comprising a recording layer for recording information.

Before the placement of the recording layer, it may be preferable to provide an under-layer comprising one or more elements selected from the group consisting of Cr, Ni, P, Co, Zr, Mn, Fe, Ti, Cu, Zn, Nb, Mo, Tc, Ru, Pd, Ag, Cd, In, Sn, Sb, Hf, Ta, W, Re, Os, Ir, Pt and Au.

There is no particular limitation to the recording layer, examples of which may include a cobalt recording layer and Co—Cr—Ta. The recording layer may be provided by any method known. There is also no limitation to the thickness of the recording layer, and this may be any ordinary thickness.

A carbon protection layer or a fluorine-based lubricating layer may also be provided above the recording layer.

The invention is described below based on examples. However, it should not be construed that the present invention is limited to these.

EXAMPLES 1 TO 20 AND COMPARATIVE EXAMPLES 1 TO 11

A substrate for a magnetic recording medium member having an external diameter of 65 mm, an inside diameter of 20 mm and a thickness of 0.64 mm was fabricated from monocrystalline silicon. A multiple number of substrates were prepared by polishing the substrate firstly with (i) Suba400 (manufactured by Rodel Co.), which is a non-woven cloth, together with colloidal silica (3%-SSS, manufactured by Nissan Chemical Co.), and secondly with Supreme RN—H (manufactured by Rodel Co.) together with colloidal silica (3%-SSS, manufactured by Nissan Chemical Co) so as to have a roughness of 0.1 nm (as measured by AFM, measured with a viewing field of 10 μm square).

The substrates were etched according to the conditions shown in Table 1. Immediately following the step of etching, the substrates were scrubbed and dried. Then, the condition of the surface was visually inspected with a focus lamp (to check for defects and spots) and observed under an AFM, wherein the image of the surface topography was scrutinized.

Measurement of Roughness and Maximum Height, and Measurement of Protrusions

Atomic force microscopy observation of the substrate was performed using an atomic force microscope (Scanning Probe Microscope JSPM-4200, manufactured by JEOL) to measure the surface roughness. The observation area was set to 10 μm square. The protrusions were measured visually through AFM observation.

Figure 2A:
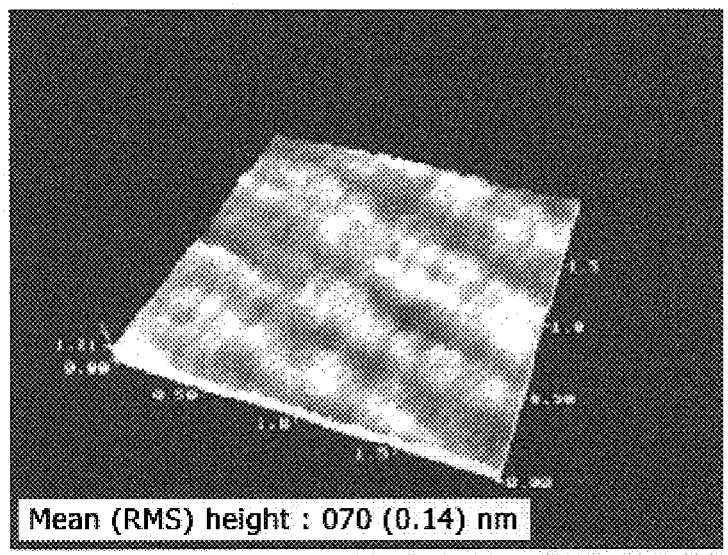
FIG. 2(A) is the result of AFM observation of the surface of an un-etched substrate of Comparative Example 11.
Figure 2B:
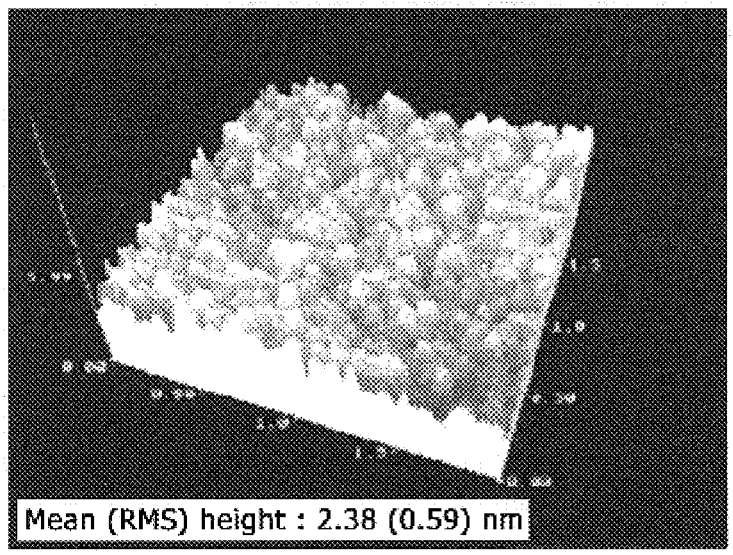
FIG. 2(B) is the result of AFM observation of the surface of an etched substrate of Example 2.

FIG. 2(A) is the result of AFM observation of an un-etched surface of the substrate of Comparative Example 11, and FIG. 2(B) is the result of AFM observation of an etched surface of the substrate of Example 2.

Visual Inspection with Focus Lamp

Figure 3A:
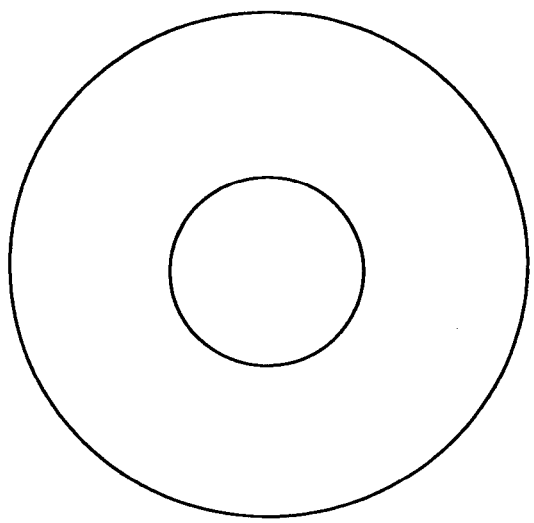
FIG. 3(A) is a sketch of defects observed on the surface of the substrate produced by treating the substrate obtained in Example 2 with ultrasound.
Figure 3B:
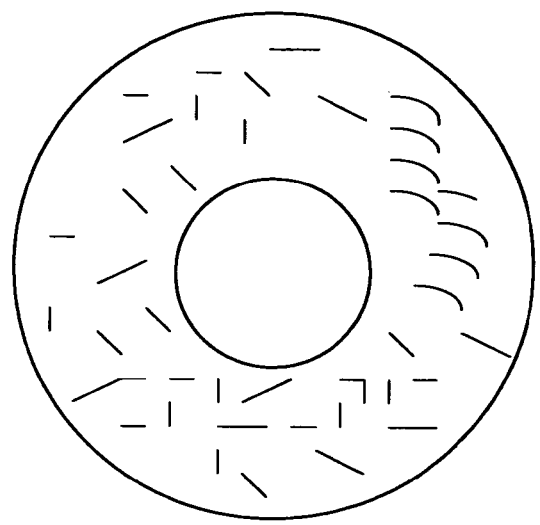
FIG. 3(B) is a sketch of defects observed on the surface of the substrate obtained in Comparative Example 8 that has not been treated with ultrasound. Both were observed under a focus lamp.

The substrates were visually inspected for the presence and number of defects and particles using a focus lamp (manufactured by Yamada Optical Co.) with a brightness of 100,000 lux. FIG. 3(A) is a sketch of defects observed on the surface of the substrate obtained in Example 2 in which the substrate was treated with ultrasound. FIG. 3(B) is a sketch of defects observed on the surface of the substrate obtained in Comparative Example 8 in which the substrate was not treated with ultrasound. Both were observed under a focus lamp. Absolutely no defects were found on the former, while innumerable defects were seen on the latter.

External Imaging with an Optical Surface Analyzer

An image of the surface topography was observed using an OSA (manufactured by Candela Corporation).

Investigation of the pH

The roughness of the surface and the external appearance were investigated, while varying the pH of the etching solution from 9 to 14 using KOH. When the pH value was 9, there was substantially no change in the roughness. When the pH value was 14, there was a tendency for the surface to become rugged and for defects to occur. On the other hand, when the pH was 10 to 13, no defects or spots were generated and it was possible to control the number of protrusions and the roughness.

Investigation of the Surfactant

The roughness of the surface of the substrate and the external appearance were investigated, while varying the concentration of the surfactant from 0.005 to 20% by weight. When the concentration was 0.005% by weight or less, the wettability of the surface of the substrate was reduced and defects and spots of the surface of the substrate occurred after the etching. When the concentration was 20% by weight or more, although the range of the number of protrusions was excellent, there were cases in which the average surface roughness did not increase. On the other hand, when the concentration was from 0.01 to 10% by weight, no defects or spots were generated and control of the number of protrusions and the roughness was excellent. It was also confirmed that the average roughness tends to drop as the concentration of the surfactant increases.

Investigation of the Temperature

The roughness of the surface and the external appearance were investigated, while varying the temperature of the etching solution from 10 to 100° C. When the temperature of the etching solution was 10° C. or less, there were cases in which etching did not proceed and there was no etching effect. When the temperature was 100° C. or greater, innumerable bubbles were generated from the substrate because of rapid reaction with the alkali, and there were cases in which defects and spots occurred on the surface of the substrate. On the other hand, when the temperature of the etching solution was from 20 to 90° C., there was no generation of defects or spots on the surface and there was excellent control of the number of protrusions and the roughness.

Investigation of the Ultrasound Frequency

The application or non-application, as well as the frequency of the ultrasound in the etching solution was investigated. The surface of the substrate which had been etched without use of ultrasound was found to have defects and spots caused by selective etching. On the other hand, all substrates to which ultrasound had been applied had neither defects nor spots, and the number of protrusions and the roughness could be excellently controlled.

Investigation of Rotation or Shaking

Figure 4A:
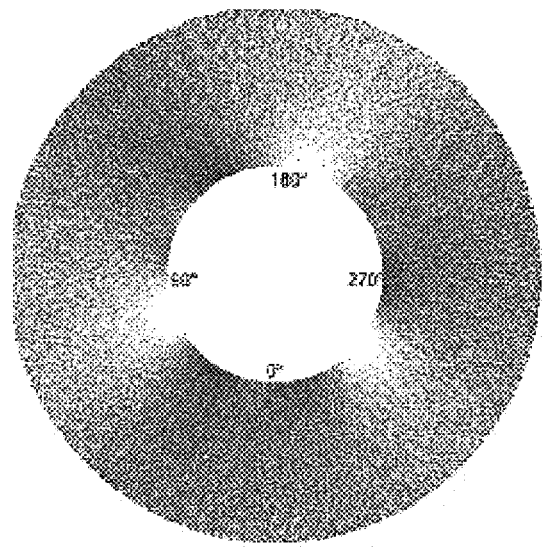
FIG. 4(A) is a result of observation of a topographical image taken by OSA, of the substrate obtained in Example 3 in which the application of ultrasound was combined with rotation of the substrate.
Figure 4B:
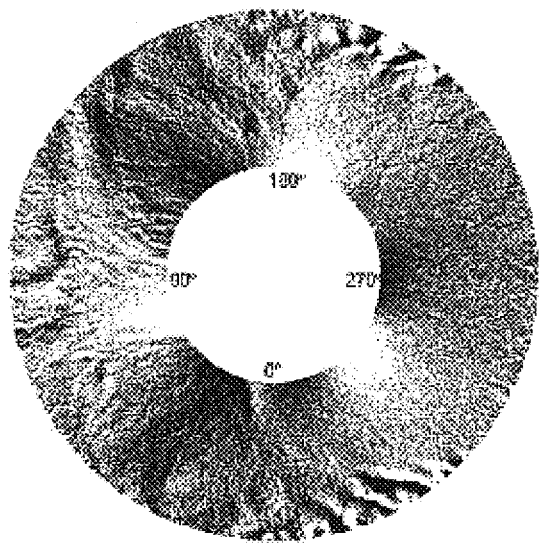
FIG. 4(B) is a result of observing a topographical image taken by OSA, of the substrate obtained in Comparative Example 9 in which only ultrasound was applied.

FIG. 4(A) is a result of observation of a topographical image taken by OSA, of a substrate obtained in Example 3 in which the application of ultrasound was combined with rotation of the substrate. FIG. 4(B) is a result of observing a topographical image taken by OSA, of a substrate obtained in Comparative Example 9 in which only ultrasound was applied. Although the substrate obtained in Comparative Example 9 had no defects, the entire surface of the substrate had large undulations.

The substrate surfaces which had not been rotated or shaken at all in this way had unevenness and etching non-uniformities across their entire surfaces. On the other hand, substrates that had been rotated or shaken had neither defects nor spots, and the number of protrusions and roughness could be excellently controlled. However, at a rotation or shaking frequency of 100 times per minute or higher, there were cases in which the bubbles of the gas generated during etching were entrained in the etching solution, causing spots of the surface of the substrate.

Head Flying Test

A Cr under-layer of 100 nm, a Co—Cr—Ta magnetic recording layer of 60 nm, and a protective layer of 30 nm, were formed in that order by RF sputtering on the silicon substrate of Examples 1 to 3, and Comparative Examples 1 and 11 (non-treated example) at a substrate temperature of 250° C. in an argon gas atmosphere. After coating these magnetic recording media with a lubricant, the flying height was set to 6 nm and the flying stability of the head was observed. In addition, the presence of adhesion between the head and the substrate was checked while performing a contact start/stop (CSS).

As a result, the flying stability of the head for Examples 1 to 3 was high and there was no adhesion during the CSS test. The stability for Examples 2 and 3 was particularly high and excellent results were obtained. On the other hand, the head flying stability for Comparative Examples 1 and 11 was poor. The stability for the non-treated Comparative Example 11 was particularly poor and head adhesion occurred during the CSS test. Although the stability for Comparative Example 1 was slightly better than that for Comparative Example 11, an excellent result could not be obtained since etching was insufficient. A head flying test could not be performed with substrates obtained in the other Comparative Examples because of defects or spots on the surface of the substrate.

Observation of Defects and Spots of the Substrate Surface

As a result of inspection of OSA images of defects and spots generated on the surface of the substrates, it was found that the defects and spots were projections. It seems that these were formed because etching had not occurred on the defect parts due to selective etching caused by distortions through polishing.

Results Shown in Tables 1 and 2

Even if the flying height, which is indispensable for realizing high recording densities, is set low, it is possible to stabilize the flying of the head and prevent head adhesion during CSS testing. It is the result of the present invention imparting specific protrusions and roughness to the surface of a substrate.

Furthermore, the surface of the substrate may be easily roughened by etching the surface of the silicon substrate through the method of the present invention.

TABLE 1

|  |  | surfactant concentration (%) *1 | pH *2 | temperature of etching solution (° C.) | immersion period (min) | ultra-sound (kHz) | number of rotation (/min) | number of shaking (/min) | number of portrusions per μm$^2$ | average roughness (nm) | maximum height (nm) | defects | spots |
|---|---|---|---|---|---|---|---|---|---|---|---|---|---|
| Example | 1 | 1.00 | 10.0 | 50 | 20 | 45 | 20 | 0 | 40 | 0.30 | 1.50 | none | none |
| | 2 | 1.00 | 11.0 | 50 | 20 | 45 | 20 | 0 | 150 | 0.60 | 3.20 | none | none |
| | 3 | 1.00 | 12.0 | 50 | 20 | 45 | 20 | 0 | 500 | 1.00 | 6.00 | none | none |
| | 4 | 1.00 | 13.0 | 50 | 20 | 45 | 20 | 0 | 400 | 1.50 | 9.00 | none | none |
| | 5 | 0.01 | 12.0 | 60 | 15 | 45 | 30 | 0 | 400 | 1.50 | 8.50 | none | none |
| | 6 | 0.50 | 12.0 | 60 | 15 | 45 | 30 | 0 | 450 | 1.30 | 8.00 | none | none |
| | 7 | 5.00 | 12.0 | 60 | 15 | 45 | 30 | 0 | 500 | 0.80 | 4.00 | none | none |
| | 8 | 10.00 | 12.0 | 60 | 15 | 45 | 30 | 0 | 500 | 0.60 | 3.60 | none | none |
| | 9 | 1.00 | 12.0 | 20 | 30 | 45 | 15 | 0 | 45 | 0.30 | 1.20 | none | none |
| | 10 | 1.00 | 12.0 | 40 | 30 | 45 | 15 | 0 | 70 | 0.30 | 1.30 | none | none |
| | 11 | 1.00 | 12.0 | 60 | 30 | 45 | 15 | 0 | 450 | 1.20 | 6.00 | none | none |
| | 12 | 1.00 | 12.0 | 90 | 30 | 45 | 15 | 0 | 250 | 1.80 | 9.00 | none | none |
| | 13 | 1.00 | 12.0 | 60 | 20 | 30 | 10 | 0 | 500 | 1.00 | 5.00 | none | none |
| | 14 | 1.00 | 12.0 | 60 | 20 | 45 | 10 | 0 | 500 | 1.00 | 5.30 | none | none |
| | 15 | 1.00 | 12.0 | 60 | 20 | 100 | 10 | 0 | 450 | 0.80 | 4.50 | none | none |
| | 16 | 1.00 | 12.0 | 60 | 20 | 1000 | 10 | 0 | 450 | 0.80 | 4.30 | none | none |
| | 17 | 1.00 | 12.0 | 60 | 20 | 3000 | 10 | 0 | 450 | 0.75 | 4.00 | none | none |
| | 18 | 1.00 | 12.0 | 50 | 20 | 45 | 0 | 10 | 450 | 0.85 | 6.50 | none | none |
| | 19 | 1.00 | 12.0 | 50 | 20 | 45 | 1 | 0 | 450 | 0.85 | 6.00 | none | none |
| | 20 | 1.00 | 12.0 | 50 | 20 | 45 | 40 | 0 | 450 | 1.00 | 7.20 | none | none |
| | 21 | 1.00 | 12.0 | 50 | 20 | 45 | 80 | 0 | 450 | 1.20 | 7.20 | none | none |

*1 Polyoxyethylene alkyl ether was used as a surfactant.
*2 Potassium hydroxide was used for adjustment of pH.

TABLE 2

|  |  | surfactant concentration (%) *1 | pH *2 | temperature of etching solution (° C.) | immersion period (min) | ultra-sound (kHz) | number of rotation (/min) | number of shaking (/min) | number of portrusions per μm$^2$ | average roughness (nm) | maximum height (nm) | defects | spots |
|---|---|---|---|---|---|---|---|---|---|---|---|---|---|
| Comp. Ex. | 1 | 1.00 | 9.0 | 50 | 20 | 45 | 20 | 0 | 15 | 0.15 | 0.80 | none | none |
| | 2 | 1.00 | 14.0 | 50 | 20 | 45 | 20 | 0 | 30 | 2.50 | 12.00 | present | present |
| | 3 | 0.005 | 12.0 | 60 | 15 | 45 | 30 | 0 | 400 | 3.20 | 15.50 | present | present |
| | 4 | 20.00 | 12.0 | 60 | 15 | 45 | 30 | 0 | 500 | 0.20 | 1.00 | none | none |
| | 5 | 1.00 | 12.0 | 100 | 30 | 45 | 15 | 0 | 100 | 3.00 | 16.00 | present | present |
| | 6 | 1.00 | 12.0 | 10 | 30 | 45 | 15 | 0 | 10 | 0.10 | 0.50 | none | none |
| | 7 | none *3 | 12.0 | 50 | 20 | 45 | 20 | 0 | 500 | 1.80 | 11.00 | present | present |
| | 8 | 1.00 | 12.0 | 50 | 20 | none | 20 | 0 | 500 | 0.80 | 5.60 | present | present |
| | 9 | 1.00 | 12.0 | 50 | 20 | 45 | none | none | 500 | 1.00 | 6.50 | present | present |
| | 10 | 1.00 | 12.0 | 50 | 20 | 45 | 100 | 10 | 450 | 1.50 | 10.50 | present | present |
| | 11 | — | — | — | — | — | — | — | 10 | 0.10 | 0.40 | none | none |

*1 Polyoxyethylene alkyl ether was used as a surfactant.
*2 Potassium hydroxide was used for adjustment of pH.
*3 Only potassium hydroxide was used.

What is claimed is:

1. A surface-treated silicon substrate for a magnetic recording medium, comprising a surface having 40 to 500 protrusions per one μm$^2$ with a maximum height in the range of 1 to 9 nm, and having an average roughness of 0.3 to 1.8 nm, wherein there are no defects or spots and no large undulations on the entire surface of the substrate, and wherein the substrate is a monocrystalline silicon substrate.

2. A magnetic recording medium comprising the surface-treated silicon substrate of to claim 1.

3. The magnetic recording medium of claim 2, wherein the magnetic recording medium further comprises an underlayer and a magnetic recording layer on the underlayer.

* * * * *